(12) United States Patent
Tamaki et al.

(10) Patent No.: US 9,108,519 B2
(45) Date of Patent: Aug. 18, 2015

(54) METER DISPLAY DEVICE FOR ELECTRIC VEHICLE

(75) Inventors: Kenji Tamaki, Wako (JP); Atsuro Takeno, Wako (JP); Yasuhiro Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 744 days.

(21) Appl. No.: 13/215,521

(22) Filed: Aug. 23, 2011

(65) Prior Publication Data

US 2012/0049797 A1 Mar. 1, 2012

(30) Foreign Application Priority Data

Aug. 25, 2010 (JP) ................. 2010-188318

(51) Int. Cl.
*H02J 7/00* (2006.01)
*B60L 11/18* (2006.01)
*B60L 3/04* (2006.01)
*G01D 7/06* (2006.01)
*G01D 11/28* (2006.01)

(52) U.S. Cl.
CPC ............... *B60L 11/1803* (2013.01); *B60L 3/04* (2013.01); *B60L 11/1818* (2013.01); *B60L 11/1868* (2013.01); *B60L 11/1872* (2013.01); *B60L 11/1877* (2013.01); *G01D 7/06* (2013.01); *G01D 11/28* (2013.01); *B60L 2200/12* (2013.01); *B60L 2210/12* (2013.01); *B60L 2240/36* (2013.01); *B60L 2250/10* (2013.01); *B60L 2250/16* (2013.01); *Y02T 10/7005* (2013.01); *Y02T 10/7066* (2013.01); *Y02T 10/7233* (2013.01); *Y02T 90/127* (2013.01); *Y02T 90/14* (2013.01)

(58) Field of Classification Search
USPC ......................................................... 320/109
See application file for complete search history.

(56) References Cited

U.S. PATENT DOCUMENTS

| | | | | |
|---|---|---|---|---|
| 5,283,513 | A  * | 2/1994 | Fujita et al. | 320/138 |
| 7,795,838 | B2 * | 9/2010 | Singarajan et al. | 320/104 |
| 2007/0233334 | A1* | 10/2007 | Kozarekar | 701/22 |
| 2009/0127930 | A1 | 5/2009 | Senda | |
| 2010/0102945 | A1* | 4/2010 | Watson et al. | 340/462 |

FOREIGN PATENT DOCUMENTS

| | | |
|---|---|---|
| JP | 62-058111 | 3/1987 |
| JP | 09-098502 | 4/1997 |
| JP | H09-98502 | 4/1997 |

(Continued)

*Primary Examiner* — Edward Tso
*Assistant Examiner* — Robert Grant
(74) *Attorney, Agent, or Firm* — Rankin, Hill & Clark LLP

(57) ABSTRACT

An electric vehicle includes a main battery, a motor generating drive power of the vehicle by supply of electric power from the main battery, an output control circuit for the motor, a charging connector for supplying electric power from an external to the main battery, and a meter display device. The meter display device includes a display section including at least a vehicle speed displaying portion and a charging connector condition displaying portion displaying information related to the condition of the charging connector. The charging connector condition displaying portion displays information on maintenance of the charging connector and is disposed adjacent the vehicle speed displaying portion. A main battery residual displaying portion and a sub battery residual displaying portion are disposed around the vehicle speed displaying portion.

12 Claims, 8 Drawing Sheets

(56) References Cited

FOREIGN PATENT DOCUMENTS

| JP | 09-098502 | 8/1997 |
| JP | 2001-008311 | 1/2001 |
| JP | 2009-173194 | 8/2009 |
| JP | 2010-068626 | 3/2010 |
| JP | 2010-124538 | 6/2010 |

* cited by examiner

METER DISPLAY DEVICE FOR ELECTRIC VEHICLE

BACKGROUND OF THE INVENTION

1. Field of the Invention

The present invention generally relates to a meter display device for an electric vehicle and, in particular, to a meter display device for an electric vehicle, which can display a maintenance time of a charging connector, a charging condition of a sub battery, etc. in an easily confirmed manner and location.

2. Description of Related Art

An electric vehicle meter display having an indicator for indicating that a charging cord is connected to a charging connector on a vehicle side and being arranged in the proximity of a speed indicating device is known in the art. For example, Japanese Patent No. 3018958 shows an indicating device in which, when a cord for charging (charging cable) is removed from a charging connector before full charging is achieved and, thus, charging is cancelled, a lamp that serves as an indicator is turned on and gives a rider a warning indicating that the charging is not completed.

SUMMARY OF THE INVENTION

As the number of times the charging cord is inserted into and removed from the charging connector provided at the vehicle increases, the contact resistance of the terminals inside the charging connector and the charging cord becomes larger. Therefore, over time the temperature of the charging connector may be increased during charging, so that it is desirable to inform the user that the temperature has become equal to or greater than a fixed value. Accordingly, a structure is required to indicate to the user, in an easily recognized manner, that the temperature of the charging connector has become equal to or greater than the fixed value and that it is time for maintenance.

Moreover, in an electric vehicle such as an electric motorcycle, etc., there may be employed a system including a main battery for supplying electric power to a motor, and a sub battery adapted to be charged with voltage of the main battery and for supplying electric power to a control section, etc. at the time of driving of the vehicle (starting time). In this case, it is desirable for the user to easily confirm a charging condition of the sub battery as well as a charging condition of the main battery. Moreover, in the case of the electric motorcycle in which a layout space is more limited than in a four-wheeled vehicle, it is desirable to have a meter display device be as small as possible.

The present invention provides an electric vehicle having a meter display device that displays a maintenance time of a charging connector, a charging condition of a sub battery, etc., while being small-sized.

In accordance with the present invention, an electric vehicle includes a main battery, a motor generating drive power for the vehicle by electric power supplied from the main battery, a control section controlling an output of the motor, a charging connector used to supply electric power from an external to the main battery, and a meter display device. The meter display device includes a display section having at least a vehicle speed displaying portion and a charging connector condition displaying portion. The charging connector condition displaying portion displays information related to maintenance of the charging connector and is disposed adjacent the vehicle speed displaying portion, thereby allowing the user to easily identify and confirm the charging connector maintenance information.

In further accordance with the present invention, an electric vehicle includes a main battery, a motor generating drive power of the vehicle by electric power supplied from the main battery, a control section controlling an output of the motor, a sub battery charged by the electric power supplied from the main battery and supplying operation electric-power for the control section at the time of starting of the motor, and a meter display device. The meter display device includes a display section including at least a vehicle speed displaying portion and a main battery residual displaying portion displaying a battery residual of the main battery, and a sub battery residual displaying portion displaying a battery residual of the sub battery. The sub battery residual displaying portion is disposed adjacent the vehicle speed displaying portion, thereby allowing the user to confirm the condition of the sub battery during operation of the vehicle.

In further accordance with the present invention, the meter display device is provided with a sub battery residual displaying portion performing battery residual display of the sub battery. One of the charging connector condition displaying portion and the sub battery residual displaying portion is disposed adjacent a left side of the vehicle speed displaying portion, and the other is disposed adjacent a right side of the vehicle speed displaying portion. Therefore, the vehicle speed displaying portion, whose frequency of confirmation by the user is high, is arranged at a center and the charging connector condition displaying portion and the sub battery residual displaying portion are disposed so as to be positioned on the left side and right side of the vehicle speed displaying portion, so that the user may easily confirm the charging connector condition displaying portion and the sub battery residual displaying portion during the running.

The meter display device is further provided with a main battery residual displaying portion displaying a battery residual of the main battery. The main battery residual displaying portion is disposed adjacent to the vehicle speed displaying portion. Therefore, the user can easily confirm the main battery residual at the time of confirming vehicle speed.

The main battery residual displaying portion includes a plurality of segments arranged in an oblong fashion. Therefore, it is possible to prevent vertical sizes of the display portion from becoming large, while providing a large display region.

The control section limits an output of the motor when temperature of the main battery is outside of the upper and lower values of a predetermined temperature range. The control section is provided with an output limitation display portion indicating that output limitation is occurring, when the output of the motor is being limited by the control section. The output display portion is disposed adjacent the main battery residual display portion so that it is easy for the user to recognize a cause of response delay when the response to vehicle acceleration instructions is delayed.

The meter display device is also provided with an odo/trip display portion displaying a total travel distance and a sectional travel distance of the vehicle. The odo/trip display portion is oblongly disposed adjacent the vehicle speed display portion to permit the odo/trip information to be confirmed at the same time as the vehicle speed information.

In further accordance with the present invention, the meter display device is provided with a charge display portion displaying that the main battery has been subjected to charging, and a regeneration charge display portion displaying that the main battery is in regeneration charging. The charge display portion and the regeneration charge display portion are disposed adjacent the main battery residual displaying portion to make it easy to confirm that the main battery is subjected to charging or regenerative charging while checking the vehicle speed.

The vehicle speed displaying portion is often checked or confirmed by a user during operation of the vehicle. In the present invention, the various display portions are disposed adjacent the vehicle speed displaying portion, so that the user may easily confirm information on the various display portions. Moreover, the display portions are collectively disposed around the vehicle speed displaying portion, so that miniaturization of the meter display device is realized.

DETAILED DESCRIPTION OF THE INVENTION

Figure 2:
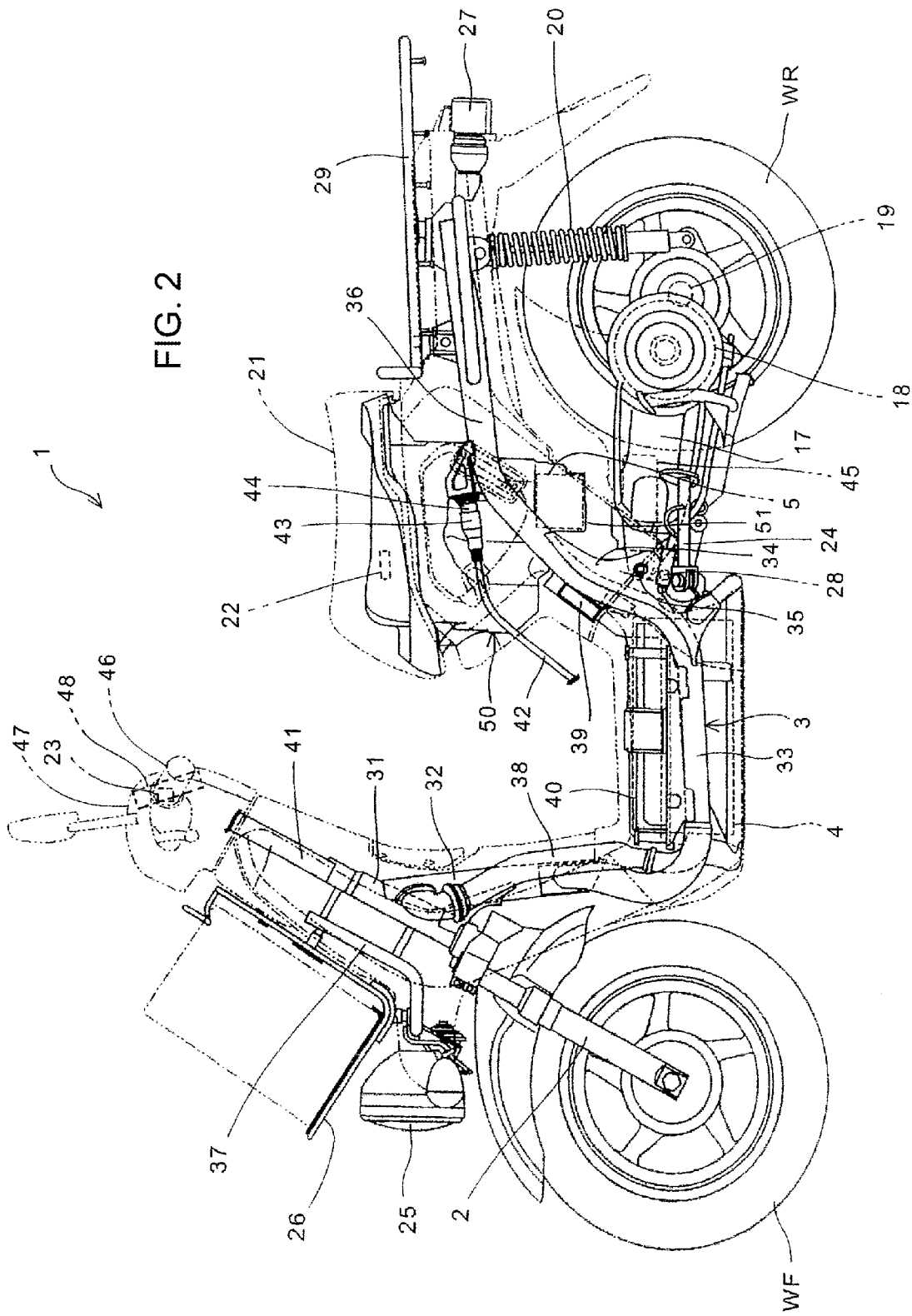
FIG. 2 is a left side view of an electric vehicle on which the meter display device according to the present invention is carried.

An embodiment of the present invention will be explained hereinafter with reference to the drawings. FIG. 2 is a left side view of an electric vehicle on which a meter display device according to the embodiment of the present invention is carried. The electric vehicle 1 is a scooter-type motorcycle having a low-floor-type floor, in which respective element portions are attached, directly or indirectly, to a vehicle body frame 3. The vehicle body frame 3 includes a head pipe 31 serving as a front portion of the vehicle body frame, a front frame section 32 whose front end is joined to the head pipe 31 and whose rear end extends downwardly, a pair of main frame sections 33 branched to the left and right in a vehicle body width direction from the front frame section 32 and extending toward a rearward direction of a vehicle body, and rear frame sections 36 extending in an upper and rearward direction of the vehicle body from the main frame sections 33.

A front fork 2 which supports a front wheel WF is steerably supported on the head pipe 31.

A steering handlebar 46, which has an accelerator grip, is connected to an upper portion of a steering shaft 41. The steering shaft 41 extends upwardly from the front fork 2 and is supported by the head pipe 31. At the steering handlebar 46, a throttle sensor 23 that detects a turning angle of the accelerator grip (i.e., an accelerator opening) is provided.

The steering handlebar 46 is covered with a handlebar cover 47, except handlebar grips provided on both ends thereof. At the handlebar cover 47, a meter display device 48 is provided. The meter display device 48 is adapted to display information on a battery residual of a main battery 4 and a condition of a socket 44 for charging, information on a sub battery, etc. as well as information on a vehicle speed and mileage of the vehicle (the details of the meter display device will be described hereinafter).

A bracket 37, which is formed of a pipe material, is joined to a front portion of the head pipe 31. A head light 25 is attached to a front end portion of the bracket 37. A front carrier 26, which is supported by the bracket 37, is provided above the head light 25.

A bracket 34 is joined to a middle region between the main frame sections 33 and rear frame sections 36 of the vehicle body frame 3. The bracket 34 extends toward the rearward direction of the vehicle body. A pivot axis 35 which extends in the vehicle body width direction is provided at the bracket 34. A swing arm 17 is supported by the pivot axis 35 so as to be vertically swingable. An electric motor 18 which serves as a vehicle driving source is provided at the swing arm 17. An output of the electric motor 18 is transmitted to a rear wheel shaft 19 and to drive a rear wheel WR, which is supported by the rear wheel shaft 19. A housing including the rear wheel shaft 19 and the rear frame sections 36 are interconnected by a rear suspension 20.

A side stand 24, which supports the vehicle body during stopping of the vehicle, is provided at the bracket 34. The side stand 24 has a side stand switch 28, which is adapted to output a detection signal when the side stand 24 is housed in a fixed position.

The high voltage main battery 4 (having, for example, an output of 72 volts) includes a plurality of battery cells and is carried on the main frame sections 33. An upper portion of the main battery 4 is covered by a cover 40. To a front portion of the main battery 4, an air introducing pipe 38 is connected. At a rear portion of the main battery 4, an intake fan 39 is provided. Air is introduced into the main battery 4 from the air introducing pipe 38 by the intake fan 39, cools the main battery 4 and is then discharged rearwardly of the vehicle body. Incidentally, it is preferable that air is introduced through an air-cleaner (not shown) into the air introducing pipe 38.

On the rear frame sections 36, a socket 44 to which a plug 43 of a charging cable 42 extending from a battery charger (not shown) for charging the main battery 4 can be coupled is provided. A rear carrier 29 and a tail light 27 are attached to the rear frame section 36.

Between the pair of left and right rear frame sections 36, a cargo chamber 50 is provided. Within a cargo chamber bottom portion 51, which protrudes downward from the cargo chamber 50, the low voltage sub battery 5 (having, for example, an output of 12 volts) that is adapted to be charged by the main battery 4 is housed. At the swing arm 17, a power drive unit (PDU) 45 that is adapted to perform drive-control and a regeneration control of the electric motor 18 is provided.

On the cargo chamber 50, a rider's seat 21, which is also used as a lid for the cargo chamber 50, is provided. The rider's seat 21 is provided with a seat switch 22, which is adapted to be operated to output a seating signal when a rider sits on the seat.

Figure 3:
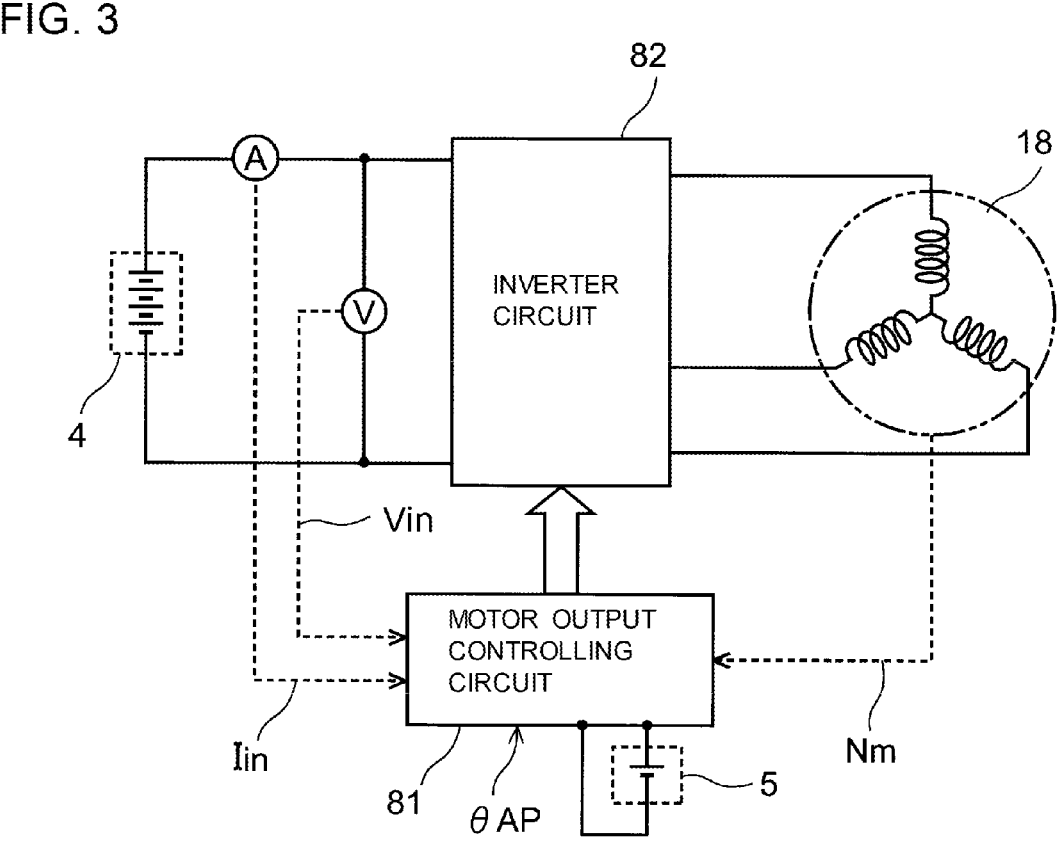
FIG. 3 is a block diagram showing an example of an output controlling section for a motor.

FIG. 3 is a block diagram showing an example of an output controlling section for the motor. A motor output controlling circuit 81 can be comprised of an electric power feedback circuit that detects a real torque, which is outputted by the motor (three-phase brushless motor), based on inputted electric power to the motor 18, and PWM-controls an inverter circuit 82 such that the inputted electric power becomes a desired value. When a user open-operates the accelerator grip to designate a running speed, the motor output controlling circuit 81 calculates a torque command responsive to this designation, based upon an accelerator opening θAP and a revolution speed Nm of the motor 18, and gives it as target electric power. The target electric power is compared to real electric power, which is calculated on the basis of electric current Iin and voltage Vin, which are inputted into the inverter circuit 82 from the main battery 4, and conversion efficiency of the inverter 82.

The motor output controlling circuit 81 feedback-controls the inverter circuit 82 so as to cause the target electric power and the real electric power to agree with each other. Required electric power is supplied to the motor output controlling circuit 81 by the sub battery 5 at the time of starting, etc. The sub battery 5 is charged based on electric power that is supplied from the main battery 4.

The motor output controlling circuit 81 is not limited to the electric power feedback control type, and can employ a well-known three-phase motor output controlling type such as an electric current feedback controlling type, etc.

Figure 4:
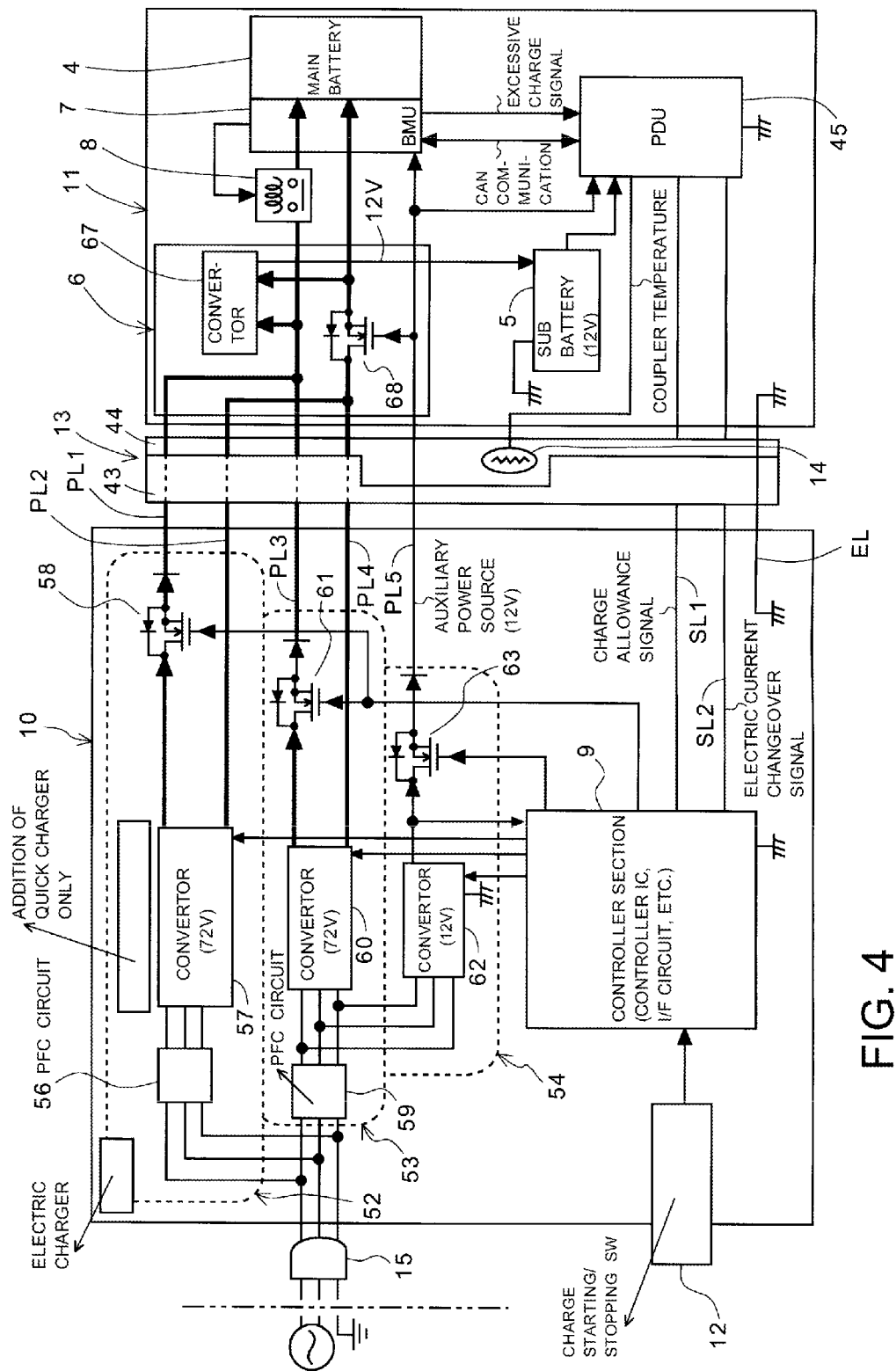
FIG. 4 is a block diagram showing a configuration of a charge controlling device for a battery.

FIG. 4 is a block diagram illustrating a structure of a charge controlling device. An electric charge system includes an electric charger 10, an electric power supply device 11 on the electric vehicle 1 side, and a charging coupler 13 interconnecting the charger 10 and the electric power supply device 11. The charging connector 13 includes the plug 43 connected to the charger 10 side as described above, and the socket 44 on the vehicle side. At the socket 44, a thermistor 14 serving as a temperature sensor is provided.

The charger 10 and the electric power supply device 11 are connected, via the coupler 13, to electric power lines PL1, PL2, PL3, PL4, an auxiliary electric-power line PL5, signal lines SL1, SL2, and an earth (ground) line EL. The electric power lines PL1, PL3 are (positive) plus lines. The electric power lines PL2, PL4 are (negative) minus lines.

The charger 10 is provided with, for example, two systems including charging electric-power generating sections 52, 53 and an auxiliary electric-power generating section 54, which are coupled to an AC plug 15 coupled to a commercial alternating current power system. Moreover, the charger 10 is provided with a charge controlling section (controller section) 9 that controls outputs of the charging electric-power generating sections 52, 53 and auxiliary electric-power generating section 54. The charge controlling section 9 includes a controller IC, an interface (I/F) circuit, etc. A charge starting/stopping switch 12 is connected to the charge controlling section 9.

The charging electric-power generating section 52 is employed when the charger 10 is configured as a quick charger and may not be provided when the charger is not configured as the quick charger. The charging electric-power generating section 52 has a PFC circuit 56 serving as a power-factor improvement circuit connected to the AC plug 15, a convertor 57 connected to the output side of the PFC circuit 56, and an FET 58 controlling an output of the convertor 57.

The charging electric-power generating section 53 has a PFC circuit 59, a convertor 60 connected to the output side of the PFC circuit 59, and an FET 61 controlling an output of the convertor 60. Similarly, the auxiliary electric-power generating section 54 has a convertor 62 connected to the output side of the PFC circuit 59, and an FET 63 controlling an output of the convertor 62. The convertors 57, 60 generate direct voltage of 72 volts, for example, and the convertor 62 generates low voltage (for example, direct voltage of 12 volts) usable as a control power source.

The electric power supply device 11, which is provided on the vehicle side, is provided with a down regulator 6 and the main battery 4 to which the electric power lines PL1, PL2, PL3, and PL4 are led. A battery managing unit (BMU) 7 and a vehicle side control section (PDU) 45 controlling the charger 10 are provided at the main battery 4. The direct output voltage of the main battery 4 is converted, via an inverter circuit (not shown) provided at the PDU 45, to a three-phase alternating voltage and applied to the motor 18 (refer to FIG. 2) that serves as the vehicle driving source.

On the electric power supply device 11 side, the electric power lines PL1, PL3 and the electric power lines PL2, PL4, which are introduced through the coupler 13, are integrated into a single plus (positive side) line PL and a single minus (negative side) line PL, respectively. At the integrated plus (positive side) line PL, a contactor 8 is provided.

At the down regulator 6, a converter 67 and an FET 68 are provided. The converter 67 converts the inputted voltage (72 volts) to, for example, charge voltage for the sub battery 5 and outputs the converted voltage.

The BMU 7 monitors the charging condition of the main battery 4. The PDU 45 and the BMU 7 are interconnected by, for example, a CAN communication line, between which the charging condition of the main battery 4 (information on a battery residual of the battery, excessive charging, etc.) and control information on the main battery 4 which corresponds to this are sent/received. Temperature detection information on the temperature of the socket 44 which is typical of the temperature of the charging connector 13 is inputted into the PDU 45 from the thermistor 14. Also, information indicative of the battery residual of the sub battery 5 is inputted into the PDU 45 from the sub battery 5. The PDU 45 and the charge controlling section 9 of the charger 10 are interconnected by the signal lines SL1, SL2.

When the main battery 4 is to be charged with the above-mentioned charger 10, the AC plug 15 is coupled to an AC outlet (an output section of the commercial electric power system). Thereby, electric power for control is supplied to the charge controlling section 9 from the converter 62. Then, when the charge starting/stopping switch 12 is turned to a starting side, the charge controlling section 9 inputs a gate signal into the FET 63 of the auxiliary electric-power generating section 54. Thereby, auxiliary power-source voltage is applied to the electric power supply device 11. By the auxiliary power-source voltage (12 volts), the FET 68 of the down regulator 6, the BMU 7, and the PDU 45 are biased.

The PDU 45 communicates with the BMU 7 and recognizes the charging condition of the main battery 4 and, if charging is possible, inputs a charge allowance signal into the charge controlling section 9 through the signal line SL1. When the charge allowance signal is inputted, the charge controlling section 9 inputs a gate signal into the FETs 61, 63 of the charging electric-power generating sections 52, 53 and causes charging electric-power (for example, voltage of 72 volts) to be produced. On-time duties of the FETs 61, 63 are controlled according to the information on the condition of the main battery 4 inputted into the charge controlling section 9 from the PDU 45.

The voltage from the charging electric-power generating sections 52, 53 is applied, through the contactor 8, to the main battery 4, which is then charged. Moreover, the voltage from the charging electric-power generating sections 52, 53 is made low level, for example, 12 volts by the converter 67 inside the down regulator 6 and used for charging the sub battery 5. Incidentally, the voltage that is made low level by the converter 67 is not only used for charging the sub battery 5 but also applied to auxiliary components including lights such as the head light, a blinker lamp, etc.

When the temperature detection information on the temperature of the charging connector 13, which is detected by the thermistor 14, is inputted into the PDU 45, the PDU 45 judges, using the function of a microcomputer provided therein, whether the temperature of the charging connector 13 reaches a fixed high-temperature. When it is judged that the temperature of the charging connector 13 has reached the fixed high-temperature, the PDU 45 sends instructions (electric current switching signal), to the charge controlling section 9 through the signal line SL2 to make the charge voltage low level. The charge controlling section 9 into which the instructions are inputted performs an output control to decrease the charging electric current only while maintaining the charging voltage relative to the converter 57 or 60. Incidentally, in a case where a charge amount of the main battery 4 is enough, the on-time duties of the FETs 58, 61 may be made to be zero and charging may be stopped. Thereby, overheating in the socket 44 can be restricted. The PDU 45 has a judgment section 451 for the temperature information and a communication section 452 for transmitting a signal to the charge controlling section 9 using the signal line SL2.

In the electric vehicle 1, the charging conditions of the main battery 4 and the sub battery 5, the temperature detection information on the charging connector 13, etc. are displayed on the meter display device 48 on the basis of the information inputted into the PDU 45.

Figure 5:
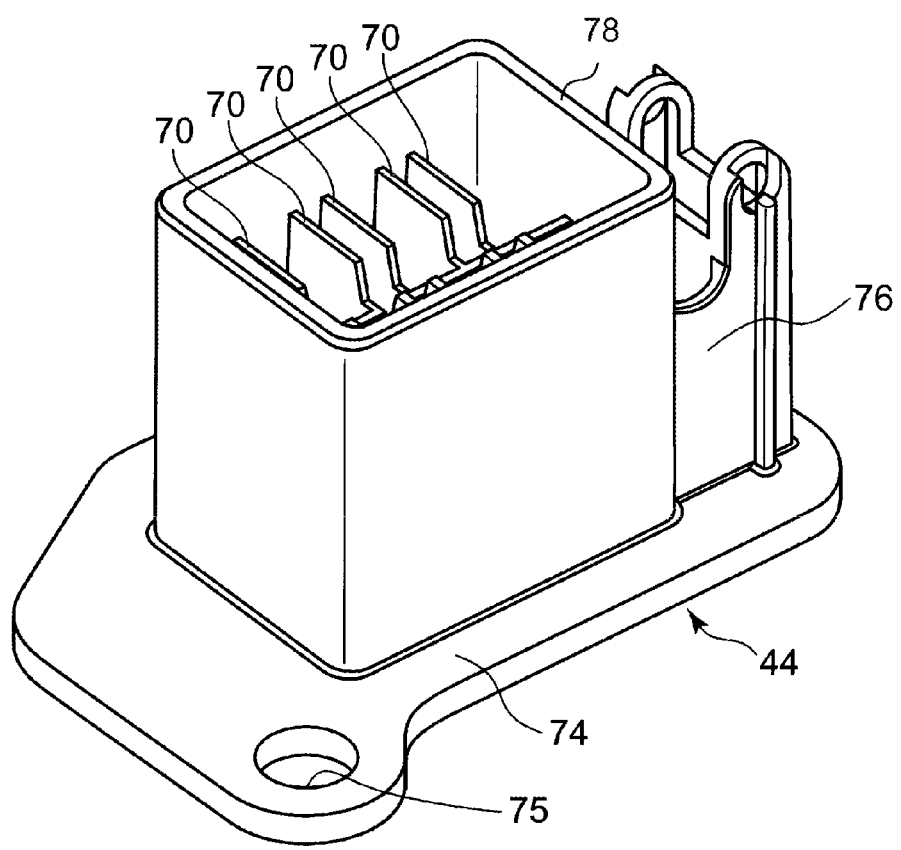
FIG. 5 is a perspective view illustrating a socket of a charging connector.
Figure 6:
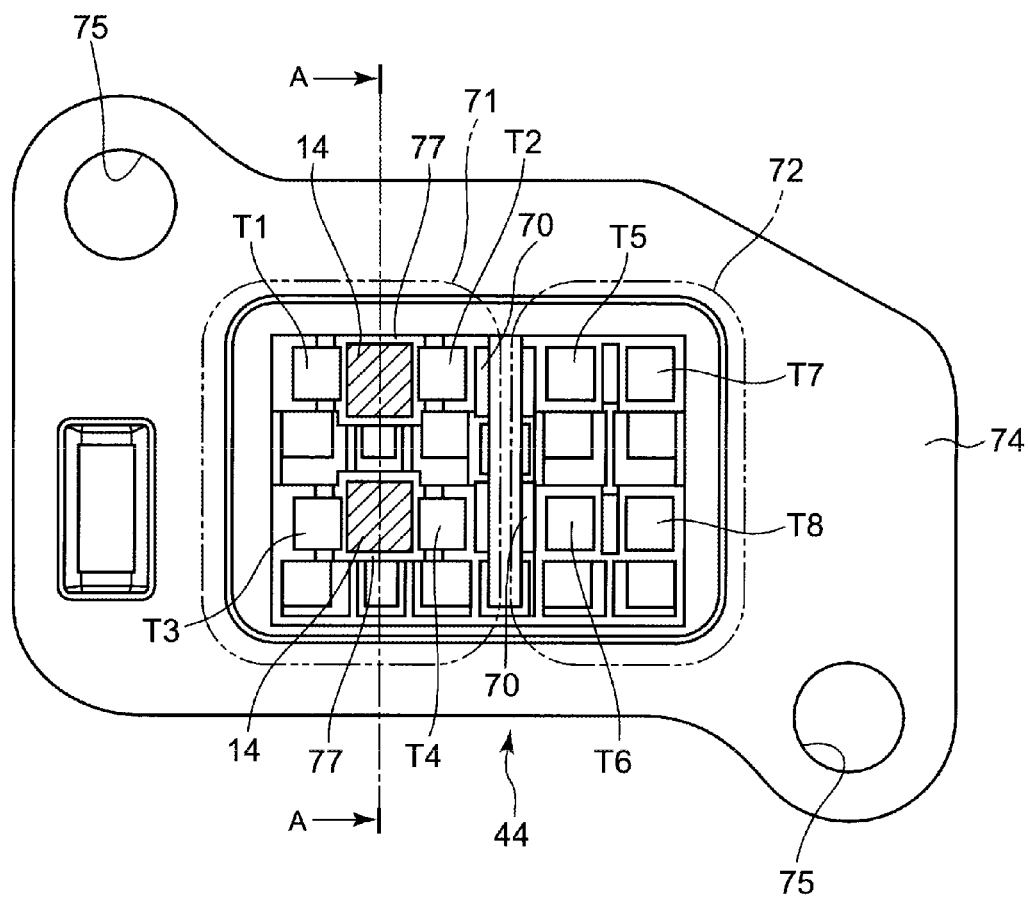
FIG. 6 is a rear plan view of the socket.
Figure 7:
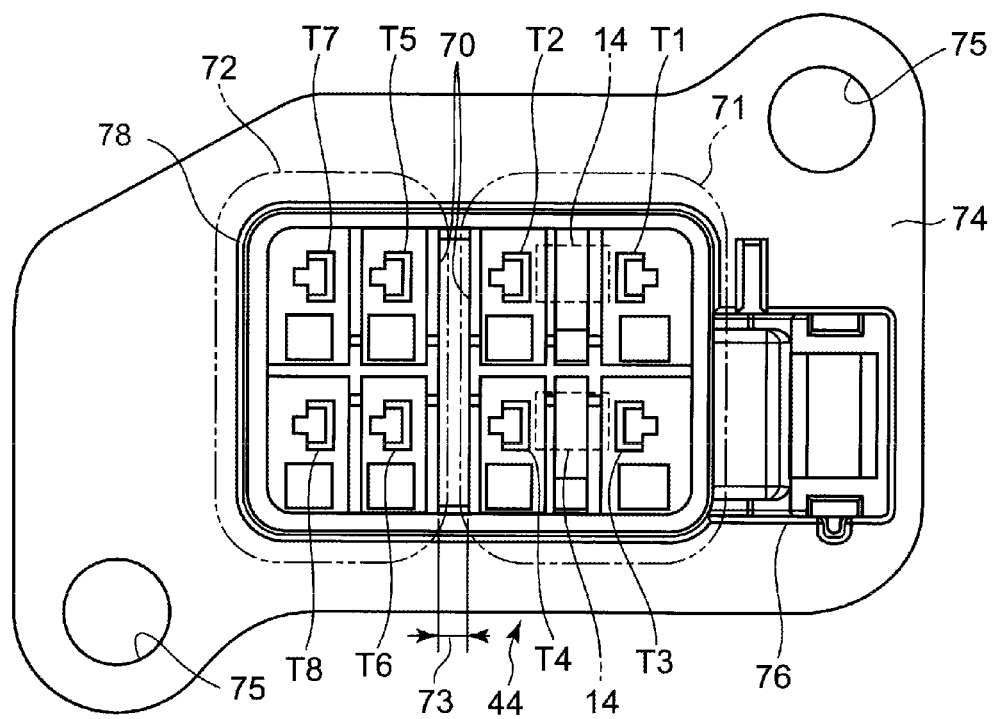
FIG. 7 is a front plan view of the socket.

Next, the arrangement of the thermistor 14 will be explained. FIG. 5 is a perspective view that illustrates the socket 44 of the charging connector 13 at which the thermistor 14 is provided. FIG. 6 is a rear plan view of the socket 44. FIG. 7 is a front plan view of the socket 44. The socket 44 has terminals T1-T8. The terminals T1, T3 are terminals for the electric power lines, to which the plus electric power lines PL1, PL3 extending toward the vehicle side are connected, respectively. The minus electric power lines PL2, PL4 which extend toward the vehicle side are connected to the terminals T2, T4, respectively. As the terminals T1-T4 for the electric power lines, terminals which are the same in size and electric rating (rated current) are employed to ensure versatility.

On the other hand, the auxiliary electric-power line PL5 and the signal lines SL1-SL3 which extend toward the vehicle side are connected to the terminals T5-T8. The respective terminals are partitioned by an insulating wall 70. In this way, the socket 44 is divided into a high voltage region 71 in which the high voltage terminals T1-T4 for the electric power lines are arranged, and a low voltage region 72 in which the terminal T5 for the auxiliary electric-source and the terminals T6-T8 for signals are arranged.

As shown in FIGS. 6 and 7 (illustrated in FIG. 7 by a broken line), the thermistor 14 is provided between the terminal T1 for the plus electric power line and the terminal T2 for the minus electric power line in the high voltage region 71 in which a rise in temperature is considered to be smaller than that of the low voltage region 72. Incidentally, in this example, the two charging electric-power generating sections 52, 53 are provided for quick charging, so that in addition to the above-mentioned thermistor, a thermistor 14 is provided between the terminal T3 for the plus electric power line and the terminal T4 for the minus electric power line in the high voltage region 71. In this way, the thermistors 14 that serve as the temperature sensors are disposed adjacent the terminals for the electric power lines of the high voltage region 71, whereby higher accuracy of detecting the temperature can be ensured.

Incidentally, between the high voltage region 71 and the low voltage region 72 including the terminals T6-T8 for the signal lines, a space (insulating space) 73 is provided. At both sides of the space 73, namely, a portion in which the high voltage region 71 and the low voltage region 72 face each other, the insulating wall 70 for the terminals T2, T4 for the minus electric power lines and the insulating wall 70 for the terminals T5, T6 are positioned. By such an arrangement, the low voltage region 72 is relatively isolated from the influence of heat from the high voltage region 71 in which the rise in temperature is relatively large, and isolated from the influence of leakage from the electric power lines relative to the signal lines.

The socket 44 is formed with flanges 74 that project toward an outer periphery of the socket from a peripheral wall portion 78 of a terminal housing portion. The socket 44 is fixed onto the rear frame sections 36 of the vehicle body frame 3 by bolts or the like, using two mounting holes 75, 75 formed in the flanges 74. A bracket 76 that is provided so as to extend between the peripheral wall portion 73 and the flange 74 constitutes a support portion for an axis by which a lid (not shown) that can cover a top of the peripheral wall portion 78 of the terminal housing portion is openably/closably journaled.

Figure 8:
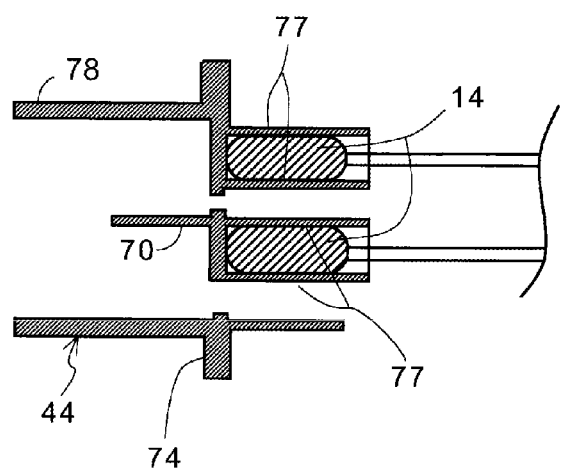
FIG. 8 is a sectional view taken at a position A-A in FIG. 6.

FIG. 8 is a sectional view taken at a position A-A in FIG. 6. As shown in FIG. 8, the thermistors 14, 14 are inserted in spaces surrounded by insulating walls 77, which protrude away from the flange 74 of the socket 44 in a direction opposite to that of the peripheral wall portion 78, the thermistors being adhesive-fixed by epoxy resin.

Figure 1:
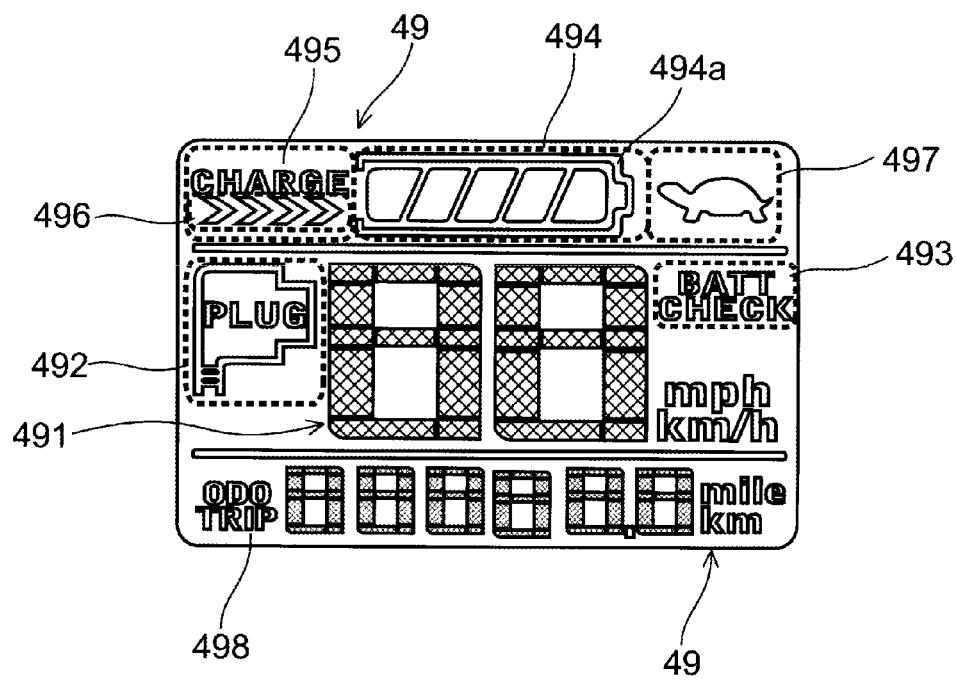
FIG. 1 is a view showing a display section of a meter display device according to the present invention.

FIG. 1 is a view showing a display section layout of the meter display device. In FIG. 1, the display section 49 that is provided at the meter display device 48 shown in FIG. 2 includes a liquid crystal display (LCD). The display section 49 is roughly divided into three vertical steps, at a central portion in the left and right direction of a middle step of which a vehicle speed displaying portion 491 is provided. On the left side of the vehicle speed displaying portion 491, a charging connector condition display portion 492 is disposed. On the right side of the vehicle speed displaying portion 491, a sub battery residual displaying portion 493 is disposed. Incidentally, the charging connector condition display portion 492 may be arranged on the right side of the vehicle speed displaying portion 491 and the sub battery residual displaying portion 493 may be arranged on the left side of the vehicle speed displaying portion 491.

Moreover, at a central portion in the left and right direction of an upper step of the display section 49, a main battery residual displaying portion 494 is provided. On the left side of the main battery residual displaying portion 494, a charge displaying portion 495 and a regeneration charge displaying portion 496 are arranged. On the right side of the main battery residual displaying portion 494, an output limitation displaying portion 497 is arranged. Incidentally, the charge displaying portion 495 and the regeneration charge displaying portion 496 may be arranged on the right side of the main battery residual displaying portion 494 and the output limitation displaying portion 497 may be arranged on the left side of the main battery residual displaying portion 494. At a lower step of the display section 49, an odo/trip display portion 498 is provided.

The vehicle speed displaying portion 491 displays the running speed of the electric vehicle 1 in double figures, each of which is displayed by twelve segments. In the display example shown in FIG. 1, the vehicle speed of 88 km/h (or 88 mph) is shown in order to illustrate a state where all the segments are biased. A display unit of the vehicle speed is previously set in either mph (mile per hour) or km/h (kilometer per hour) to a destination. The odo/trip display portion 498 also displays an odo (total travel distance) and a trip (sectional travel distance) by similar segments. Switching of odo display and trip display can be performed, for example, by operating an odo/trip changeover switch (not shown), which is provided at a region outside the display section 49 on the meter display device 48.

When a detection temperature of the thermistors 14, which is typical of the temperature of the charging connector 13, exceeds a warning temperature, the charging connector condition display portion 492 lights up and indicates that inspection of the charging connector 13 is required. The charging connector condition display portion 492 can display in both a running mode (during vehicle running) and a charging mode (during charging).

The sub battery residual displaying portion 493 displays letters "BATT CHECK", when the battery residual of the sub battery 5 is less than a standard value based on a data indicative of the battery residual of the sub battery 5 which is inputted from the PDU 45, and indicates to the user that inspection of the sub battery 5 is required. The sub battery residual displaying portion 493 can perform the display during the running mode, namely, during the running of the vehicle.

The main battery residual display portion 494 displays the battery residual of the main battery 4 through a battery residual meter frame 494a and five segments obliquely disposed within the battery residual meter frame 494a. All the segments light up at the time of full charging and are turned off from the right to the left in order as residual charge is decreased. The main battery residual display portion 494 can perform the display both in the running mode and the charging mode. Incidentally, the number of the segments within the battery residual meter frame 494a is not limited to five and may be varied according to a display resolution required.

The charge display portion 495 displays letters "CHARGE" when the main battery 4 is charged. When the charging socket 44 and the charging plug 43 are coupled to the main battery 4 and the charge starting/stopping switch 12 is turned on and the charger 10 is connected to the commercial alternating current power system, charging is commenced. In addition to being charged by the commercial alternating current power, the main battery 4 is also charged by the regeneration electric power of the motor 18. At the time of charging by this regeneration electric power, the charge display portion 495 is also made to light up.

The regeneration charge display portion 496 includes a plurality of segments (four segments in this example) forming an arrow figure, repeats lighting-up and turning-off from the left side to the right side in the order at the time of regeneration charging, and indicates that the regeneration charging is in process of being performed. That is, a leftmost segment is made to light up and then made to be turned off and successively a segment on the right side of the leftmost segment is made to light up. This action is repeated in the order and progresses to the right side. If a rightmost segment is made to light up and then made to turn off, the leftmost segment is again made to light up. During the regeneration charge, such display is repeatedly performed. Incidentally, the performing of the regeneration charge can be detected, for example, by close-operating of the accelerator grip and closing of a throttle.

In a case where the temperature of the main battery 4 is out of an output limitation temperature, the output limitation display portion 497 displays a figure indicating that the output of the motor 18 is limited. In a case where temperature is extremely low such as may occur during the winter season, etc. or conversely in a case where the temperature of the main battery 4 is extremely high, the main battery 4 cannot supply high electric current to the motor 18. For this reason, the motor output controlling section 81 has a function of limiting the drive duty of the inverter circuit 82 to a low value and limiting the output of the motor 18 when the temperature of the main battery 4 is less than a lower limit value, or equal to or higher than an upper limit value. In a case where the output of the motor 18 is limited by this function, the output limitation display portion 497 displays the predetermined figure, thus calling a user's attention. By indicating by the output limitation display portion 497 that the output of the motor 18 is limited, the user does not feel a sense of incongruity even if there is not smooth acceleration response to the accelerator grip operation. While the figure reproducing the outline of a turtle is made to light up by the output limitation display portion 497 in this example, the figure can be varied, it is not limited to the figure and display of letters may be performed.

Incidentally, the vehicle speed display portion 491 performs the vehicle speed display only during the running mode and gets segments on numerical values and unit indicative of the vehicle speed of the vehicle speed display portion 491 to turn off in the charging mode (a mode in which connection of the charging connector is performed and charging is performed by the electric power from the external).

Figure 9:
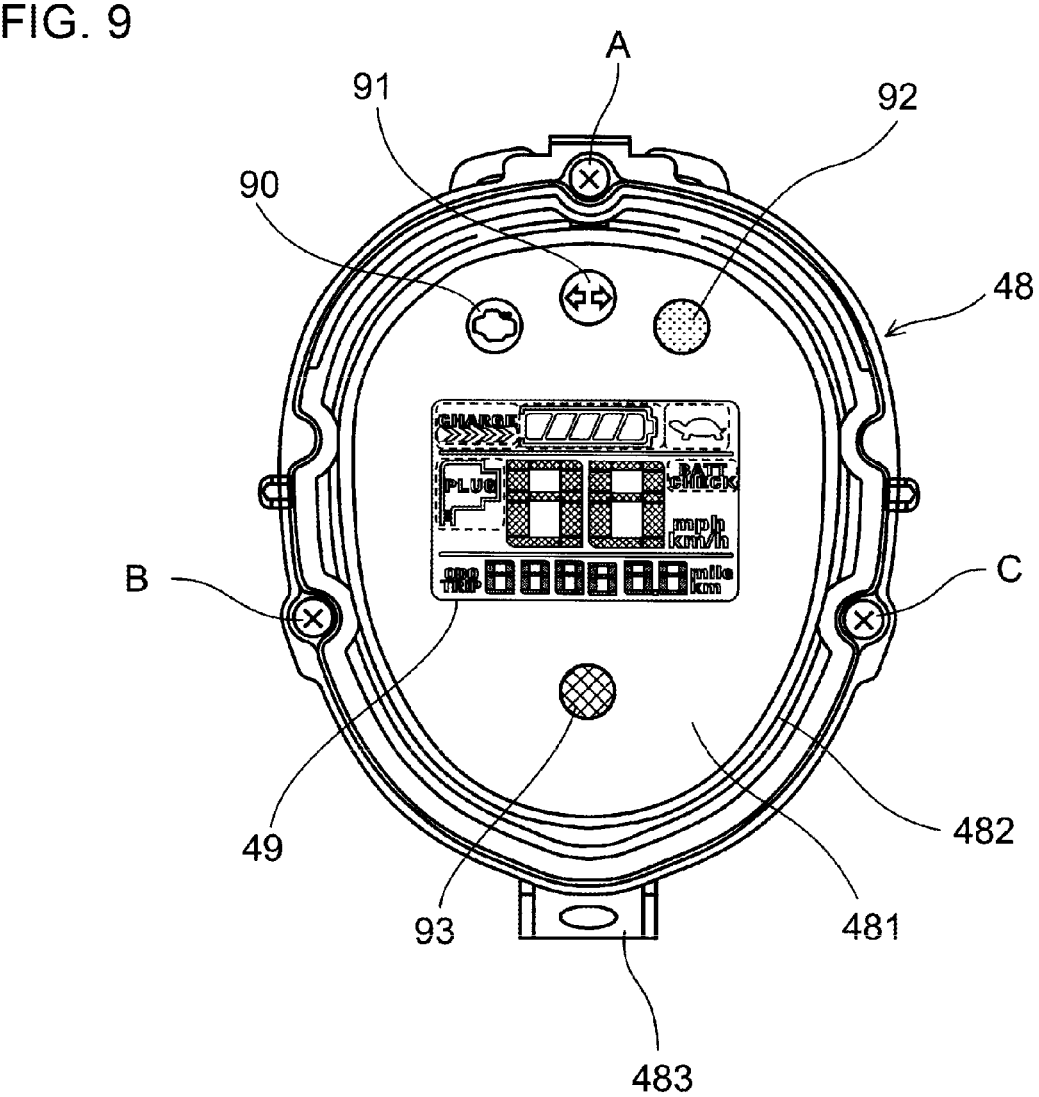
FIG. 9 is a front view of the meter display device.

FIG. 9 is a front view of the meter display device. The meter display device 48 is provided with a substrate 481 on a center of which the LCD constituting the display section 49 is arranged. A system alarm light 90, a blinker (turn signal) light 91, and a vehicle speed alarm light 92 are arranged upward of the display section 49. A standby indicating light 93 is arranged downward of the display section 49. The substrate 481 is covered by a lens 482. The lens 482 is screw-fastened at three points (A, B, and C) to a case (not shown) supporting the substrate 481. Moreover, the case has a stay 483 causing the meter display device 48 to be engagedly stopped with respect to the handlebar cover 47 (refer to FIG. 2). Incidentally, the sub battery residual displaying portion 493 may perform display that urges capacity-inspection (maintenance-inspection), by flashing on and off, etc. The display may be performed, for example, based upon the running distance of the vehicle, the time elapsed since the previous inspection, the number of electric charging and electric discharging sequences, etc.

REFERENCE SIGNS LIST

1 . . . Electric vehicle,
4 . . . Main battery,
5 . . . Sub battery,
6 . . . Down regulator,
7 . . . BMU,
13 . . . Charging connector,
18 . . . Motor,
43 . . . Plug,
44 . . . Socket,
45 . . . PDU,
48 . . . Meter display device,
49 . . . Display section,
81 . . . Output controlling circuit,
491 . . . Vehicle speed display portion,
492 . . . Charging connector condition display portion,
493 . . . Sub battery residual display portion,
494 . . . Main battery residual display portion,
495 . . . Charge display portion,
496 . . . Regeneration charge display portion,
497 . . . Output limitation display portion

What is claimed is:
1. An electric vehicle, comprising:
a main battery;
a motor generating drive power for the vehicle by electric power supplied from the main battery;
a control section controlling an output of the motor;

a charging connector that includes terminals, wherein the charging connector supplies electric power from an external to the main battery; and a meter display device, said meter display device comprising:

a display section including at least a vehicle speed displaying portion and a charging connector condition displaying portion displaying information on a condition of the charging connector, wherein the charging connector condition displaying portion displays information relating to a contact resistance of the terminals of the charging connector and is disposed adjacent the vehicle speed displaying portion.

2. The electric vehicle according to claim 1, wherein said meter display device further comprises:

a sub battery residual displaying portion performing battery residual display of a sub battery, wherein one of the charging connector condition displaying portion and the sub battery residual displaying portion is disposed adjacent a left side of the vehicle speed displaying portion, and the other is disposed adjacent a right side of the vehicle speed displaying portion.

3. The electric vehicle according to claim 1, wherein said meter display device further comprises:

a main battery residual displaying portion displaying a battery residual of the main battery, wherein the main battery residual displaying portion is disposed adjacent with respect to the vehicle speed displaying portion.

4. The electric vehicle according to claim 2, wherein said meter display device further comprises:

a main battery residual displaying portion displaying a battery residual of the main battery, wherein the main battery residual displaying portion is disposed adjacent with respect to the vehicle speed displaying portion.

5. The electric vehicle according to claim 3, wherein the main battery residual displaying portion comprises a plurality of segments arranged oblongly.

6. The electric vehicle according to claim 4, wherein the main battery residual displaying portion comprises a plurality of segments arranged oblongly.

7. The electric vehicle according to claim 3, wherein the control section is adapted to limit an output of the motor when a temperature of the main battery is greater than an upper value or less than a lower value of a predetermined temperature range;

said meter display device further comprises:

an output limitation display portion indicating that output limitation is being performed when the output limitation of the motor is performed by the control section, wherein the output limitation display portion is disposed adjacent the main battery residual display portion.

8. The electric vehicle according to claim 4, wherein the control section is adapted to limit an output of the motor when a temperature of the main battery is greater than an upper value or less than a lower value of a predetermined temperature range;

said meter display device further comprises:

an output limitation display portion indicating that output limitation is being performed when the output limitation of the motor is performed by the control section, wherein the output limitation display portion is disposed adjacent the main battery residual display portion.

9. The electric vehicle according to claim 5, wherein the control section is adapted to limit an output of the motor when a temperature of the main battery is greater than an upper value or less than a lower value of a predetermined temperature range;

said meter display device further comprises:

an output limitation display portion indicating that output limitation is being performed when the output limitation of the motor is performed by the control section, wherein the output limitation display portion is disposed adjacent the main battery residual display portion.

10. The electric vehicle according to claim 6, wherein the control section is adapted to limit an output of the motor when a temperature of the main battery is greater than an upper value or less than a lower value of a predetermined temperature range;

said meter display device further comprises:

an output limitation display portion indicating that output limitation is being performed when the output limitation of the motor is performed by the control section, wherein the output limitation display portion is disposed adjacent the main battery residual display portion.

11. The electric vehicle according claim 1, wherein said meter display device further comprises:

an odometer/tripometer display portion displaying a total travel distance and a sectional travel distance of the vehicle, wherein the odometer/tripometer display portion is oblongly disposed adjacent the vehicle speed display portion.

12. The electric vehicle according to claim 3, wherein said meter display device further comprises:

a charge display portion displaying that the main battery has been subjected to charging; and a regeneration charge display portion displaying that the main battery is in regeneration charging, wherein the charge display portion and the regeneration charge display portion are disposed adjacent the main battery residual displaying portion.

* * * * *